Aug. 11, 1959          L. K. BAIR          2,898,698
            ILLUMINATED FISHING LURE
               Filed July 8, 1954

INVENTOR.
BY Lura K. Bair

ATTORNEY

United States Patent Office 2,898,698
Patented Aug. 11, 1959

2,898,698
ILLUMINATED FISHING LURE
Lura K. Bair, Tulsa, Okla.

Application July 8, 1954, Serial No. 442,063

3 Claims. (Cl. 43—17.5)

This invention relates to an improvement in fishing lures and more particularly, but not by way of limitation, to a lure for minnows and the like normally used as fishing bait.

It is known that many fish feed on minnows and the like, thus many present day fishermen bait their hooks with minnows in order to catch more fish. Live minnows are by nature very perishable, and as a consequence, it is desirable to keep minnows in a manner that will simulate their natural habitat, thereby providing a better bait or lure for fish as well as preserving the usefulness of the minnows.

The present invention contemplates a lighted lure for attracting minnows and the like into a transparent container submerged in the water. The minnows trapped within the container attract fish to the water surrounding the lure, whereupon the fish may be more easily caught in the usual manner.

It is an important object of this invention to provide a portable lure for attracting minnows and the like in order to improve and facilitate the catching of fish.

It is another object of this invention to provide a lighted minnow lure which is simple and effective in use.

It is still another object of this invention to provide a lighted minnow lure which is durable and economical in construction.

Other objects and advantages of the invention will be evident from the following detailed description, read in conjunction with the accompanying drawings, which illustrate my invention.

Figure 1:
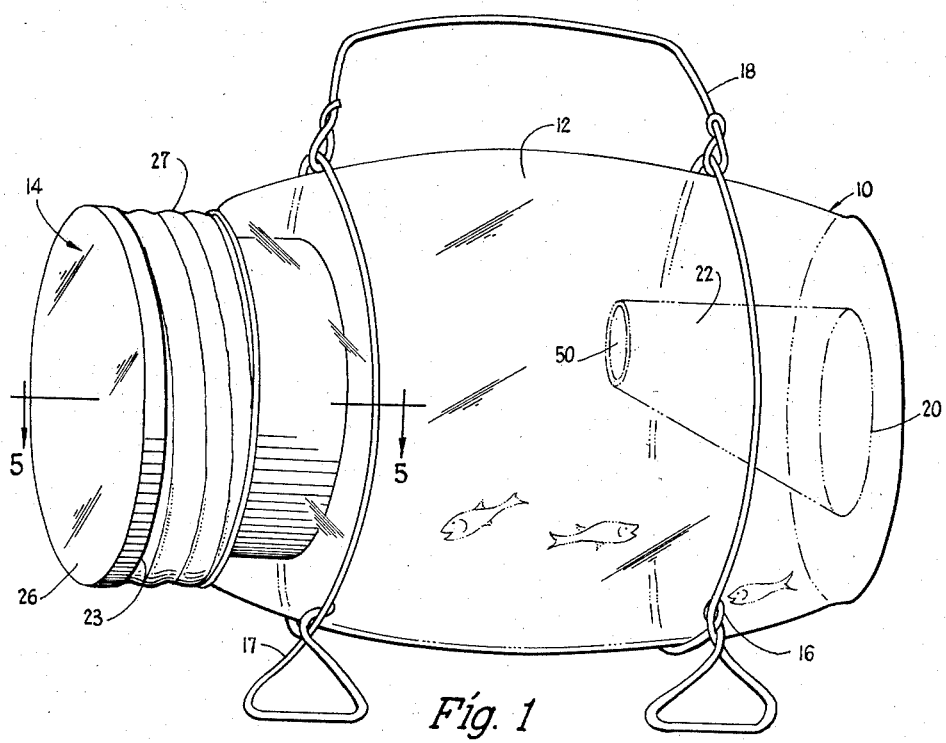
Figure 1 is a perspective view of a minnow lure embodying the invention.

Referring to the drawings in detail, reference character 10 in general represents a minnow lure comprising an elongated container 12 of substantially circular configuration, having a cooperating lighting mechanism 14, a supporting means 16 and a handle 18. The supporting means 16 is preferably made of galvanized wire or the like which completely encircles the container 12 and is bent, or shaped to form supporting legs 17, only two of which are shown. The handle 18 may be a loop secured in any suitable manner at the upper portion of the supporting means 16, as clearly shown in Fig. 1. The container 12 is preferably made of transparent plastic, glass or the like, and is provided with an aperture 20 at one end communicating with an inwardly projecting, substantially funnel shaped member 22 for directing minnows and the like into the interior of the container 12. The container 12 is further provided with a threaded portion 24 at the opposite end 23 for receiving the lighting mechanism 14 in a manner as will hereinafter be set forth.

Figure 2:
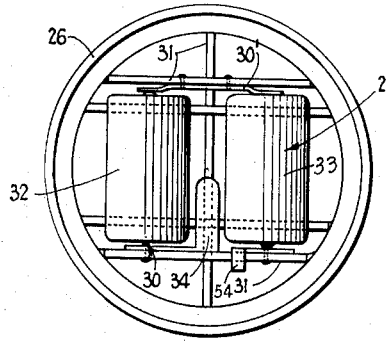
Figure 2 is a plan view of the lid shown in Figure 1, with the outer portion removed showing the power supply of the invention.
Figure 3:
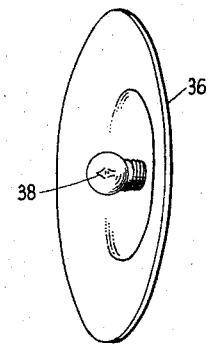
Figure 3 is a perspective view of the lighting and reflecting mechanism of the invention.
Figure 4:
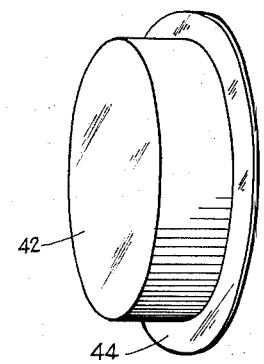
Figure 4 is a perspective view of a cover lid for protecting the lighting mechanism and power supply of the invention.

The lighting mechanism 14 comprises a sealing lid 26, preferably made of transparent plastic, glass or the like, and having a threaded portion 27 mating with the threads 24 of the container 12. A power supply 28 comprises suitable electrical connections, generally indicated at 30, supported by a bracket 31 for receiving and activating a plurality (preferably two) of small voltage dry cell batteries 32 and 33 in a manner similar to a flash light. The electrical connections 30, as shown in Fig. 2, comprise a contact arm member 34 secured to the bracket member 31 which does not conduct electricity, in contact with one end of the battery 32. A further portion of the electrical connection, as indicated at 30' (Fig. 2) is secured to the bracket member 31 in contact with the battery 32 at the opposite end thereof from the first mentioned end, and also in contact with one end of the second battery 33. A second contact arm member 54 is suitably secured to the bracket member 31 in contact with the other end of the battery 33, and spaced from the contact arm 34. The batteries 32 and 33 may be positioned on the bracket 31 with either the negative terminal or the positive terminal thereof in contact with the electrical member 30'. However, in order to provide for an electrical hook-up in series for the power supply 28, the negative terminal of one of the batteries and the positive terminal of the other battery must contact the member 30' simultaneously. It is immaterial which of the batteries is positioned so that the negative terminal thereof is in contact with the member 30' as long as the other of the batteries has its positive terminal in contact with the member 30'.

A reflector 36, preferably made of a polished metal, is provided with a small voltage light bulb 38 which protrudes through the reflector 36 so that the contact end 40 (Fig. 5) will engage against the contact arm 34 when the reflector 36 is assembled with the power supply unit 28. A substantially circular cover 42, preferably made of transparent plastic or glass is provided with an outwardly extending flange 44. The lid 42 is of a diameter sufficient to clear the power supply 28, and yet fit within the sealing lid 26 (note Fig. 5). The bulb 38 normally protrudes from the enlarged end of the reflector 36, as clearly shown in Fig. 5. Thus, when the cover member 42 is assembled with the lighting mechanism 14, as will be hereinafter set forth, the cover 42 contacts the protruding portion of the bulb 38 to hold the contact end 40 thereof securely adjacent the contact arm member 34. Simultaneously, the reflector 36 is held adjacent the arm 54 by the bulb 38. In this manner, the electrical circuit is completed and current from the batteries 32 and 33 will light the bulb 38.

Figure 5:
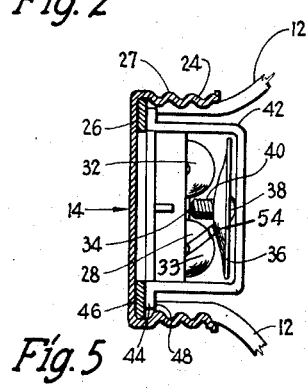
Figure 5 is a portion of a cross sectional view of the lighting mechanism of the invention taken along lines 5—5 of Fig. 1.
Figure 6:
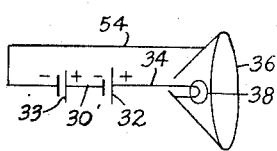
Figure 6 is a schematic wiring diagram of the lighting mechanism of the invention.

Upon assembly of the minnow trap 10, the cover member 42 is disposed over the power supply 28, as shown in Fig. 5, so that the reflector 36 and the bulb 38 are in contact with the contact arms 54 and 34, respectively, so that the bulb 38 will be lighted as previously described. A gasket 46 (Fig. 5) of any suitable sealing material is arranged around the outer periphery of the power supply unit 28 and rests adjacent the sealing lid 26. The cover 42 is then placed over the power unit 28 so that the flange 44 is in contact with the gasket 46. The sealing lid 26 is then secured to the container 12 by means of the mating threads 24 and 27. The flange 44 is pressed firmly against the gasket 46 by the lip 48 of the container 12 as the threads 24 and 27 are tightened. In this manner the lighting mechanism 14 is sealed so that water is unable to come into contact with the power unit 28, and thereby provides a water tight joint to maintain effective operation of the power unit.

In use, the assembled minnow lure is submerged in the water by any suitable means, such as a line (not shown) attached to the handle 18, and the light from the bulb 38 is directed through the water by means of the reflector 36, thereby attracting the minnows. The minnows are directed into the container 12 by the funnel 22. The restricted mouth 50 (Fig. 1) of the funnel 22 tends to keep the minnows from leaving the container once they have entered. The light from the lure shines through the water and illuminates the minnows, thus attracting larger fish to the water surrounding the device where they may be caught in any normal manner.

From the foregoing, it will be apparent that the present invention provides an effective, portable minnow lure designed to allow the minnows trapped therein to swim about freely much as they do in their natural habitat. Thus the minnows are preserved and the larger fish may be attracted to the surrounding area where they may be more easily caught.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An illuminated fishing lure adapted to be submerged in a body of water while illuminated and comprising an elongated body of transparent material, an aperture at one end of the body, a funnel member cooperating with the aperture and extending into the body, a reduced neck portion at the opposite end of the body providing a portion having exterior threads thereon, a cap member for the neck portion of the body, a battery powered illuminating unit disposed in the cap member, said cap member having threads engageable with the threaded neck portion for maintaining the illuminating unit in the compartment, and sealing means cooperating between the cap member and the neck portion for maintaining the illuminating unit in water tight condition in the compartment.

2. An illuminated fishing lure adapted to be submerged in a body of water while illuminated and comprising an elongated body of transparent material, an aperture at one end of the body, a funnel member cooperating with the aperture and extending into the body, a reduced neck portion at the opposite end of the body providing a portion having exterior threads thereon, a cap member for the neck portion of the body, a battery powered illuminating unit disposed in the cap member, said cap member having threads engageable with the threaded neck portion for maintaining the illuminating unit in the compartment, and transparent circular shaped sealing means completely encasing the illuminating unit and cooperating with the cap member and the body portion for maintaining the illuminating unit in water tight condition in the compartment.

3. An illuminated fishing lure adapted to be submerged in a body of water while illuminated and comprising an elongated body of transparent material, an aperture at one end of the body, a funnel member cooperating with the aperture and extending into the body, a reduced neck portion at the opposite end of the body providing a portion having exterior threads thereon, a cap member for the neck portion of the body, a battery powered illuminating unit disposed in the cap member, said cap member having threads engageable with the threaded neck portion for maintaining the illuminating unit in the compartment, transparent sealing means comprising a circular lid member having a peripheral flange portion and covering the illuminating unit, said flange interposed between the end of the neck and the cap member, and gasket means disposed between the flange and the cap member to provide a water tight seal for the illuminating unit.

References Cited in the file of this patent

UNITED STATES PATENTS

| | | |
|---|---|---|
| 720,990 | William | Feb. 17, 1903 |
| 1,041,195 | Thomas | Oct. 15, 1912 |
| 1,918,347 | Mitchell | July 18, 1933 |
| 2,089,897 | Judkins | Aug. 10, 1937 |
| 2,122,215 | Saelen | June 28, 1938 |
| 2,355,247 | Slocum | Aug. 8, 1944 |
| 2,534,709 | Goertzen | Dec. 19, 1950 |
| 2,536,408 | Addicks | Jan. 2, 1951 |